(12) United States Patent
Sugano et al.

(10) Patent No.: US 7,040,476 B2
(45) Date of Patent: May 9, 2006

(54) APPARATUS FOR SORTING MIXED BILLS AND BARCODED TICKETS AND METHOD THEREFOR

(75) Inventors: Tatsuya Sugano, Hyogo (JP); Kozen Nakai, Hyogo (JP); Hiroya Mouri, Caldwell, NJ (US); Michael Lazoff, Caldwell, NJ (US); Jeffery Nguyen, Cypress, CA (US)

(73) Assignee: Glory Ltd., Hyogo (JP)

( * ) Notice: Subject to any disclaimer, the term of this patent is extended or adjusted under 35 U.S.C. 154(b) by 257 days.

(21) Appl. No.: 10/652,885

(22) Filed: Aug. 28, 2003

(65) Prior Publication Data

US 2005/0045448 A1    Mar. 3, 2005

(51) Int. Cl.
G07F 7/04    (2006.01)

(52) U.S. Cl. .................................... 194/206

(58) Field of Classification Search ............. 194/206, 194/205, 207, 302; 209/534, 583, 546, 547; 700/223, 224
See application file for complete search history.

(56) References Cited

U.S. PATENT DOCUMENTS 5,249,687 A * 10/1993 Rosenbaum et al. ......... 209/3.3
6,110,044 A    8/2000 Stern ........................... 463/29
6,860,375 B1 * 3/2005 Hallowell et al. ........... 194/328

FOREIGN PATENT DOCUMENTS

EP    1.267.311 A1 * 12/2002

* cited by examiner

Primary Examiner—Donald E. Walsh
Assistant Examiner—Mark J. Beauchaine
(74) Attorney, Agent, or Firm—Ladas & Parry LLP

(57) ABSTRACT

In an apparatus and a method capable of sorting and counting bank notes and barcoded tickets by a single apparatus, the apparatus includes an insertion receptacle disposed to an upper portion of the apparatus for placing the bank notes and the barcoded tickets thereon, three stacker units disposed to lower portions of the apparatus, a conveying path interposed between the insertion receptacle and the stacker units, and first and second identification units disposed midway in the conveying path for identifying the bank notes and the barcoded tickets, respectively. The bank notes and the barcoded tickets placed on the insertion receptacle in a mixed state are drawn out to the conveying path one by one, identified by both the identification units, sorted according to results of identification of both the identification units, and stacked in the respective stacker units. The results of both the identification units are stored in a host computer.

10 Claims, 8 Drawing Sheets

APPARATUS FOR SORTING MIXED BILLS AND BARCODED TICKETS AND METHOD THEREFOR

BACKGROUND OF THE INVENTION

1. Field of the Invention

The present invention relates to a sheet processing apparatus, and more particularly, to an apparatus and method capable of sorting and stacking both bank notes and barcoded tickets in a mixed state by a single apparatus, and to a system for erasing sorted barcoded tickets. Note that, the term "barcoded ticket", each of which is described in this specification, claims, and drawings, shows a ticket having a barcode displayed on at least one of the front and back surfaces thereof.

2. Description of the Related Art

An operation mode called a cashless game is employed in game machines installed in casinos in the United States. A play method of the cashless game will be explained as to a slot machine as a typical example of the game machines used in the cashless game. It is assumed that when a player plays a game with a slot machine installed in a play room or on a play floor several times and finishes the game with the slot machine, he or she gets a total credit of, for example, $75. In this case, the credit of $75 is not paid in cash from the slot machine and a barcoded ticket, in which an amount of money corresponding to the amount of the credit is recorded as data, is printed by a printer contained in the slot machine and output from an output port of the slot machine. Note that a letter "$75" is also printed on the barcoded ticket.

When the player, who received the barcoded ticket output from the slot machine, completely finishes games in the play room or on the play floor, the he or she brings the barcoded ticket to a cashier and can exchange it with cash of an amount printed on the barcoded ticket and corresponding to the credit.

In contrast, when the player, who received the barcoded ticket, continues to play a game with other slot machines installed in the play room or on the play floor, he or she can play the game by inserting the barcoded ticket into an input port of other slot machines in place of a bank note.

Since the game can be performed with the slot machine employing the cashless game using not only a bank note but also by insertion of the barcoded ticket as described above, bank notes and barcoded tickets inserted by players are accumulated in a mixed state in the interiors of a group of the slot machines installed in the play room or on the play floor. Accordingly, the bank notes and the barcoded tickets collected from the group of the slot machines installed in the play room or the play floor are sorted into a group of the bank notes and a group of the barcoded tickets and then separately counted using a bank note counting apparatus and a barcoded ticket counting apparatus.

In the above example, however, since the bank notes and the barcoded tickets collected from the group of the slot machines must be manually sorted, the manual sorting job is time-consuming and troublesome. Further, since the bank note counting apparatus and the barcoded ticket counting apparatus are separately necessary to count the bank notes and the barcoded tickets, the cost of the apparatuses is very high and thus the above system is not reasonable. Furthermore, in a cashless game using an ordinary barcoded ticket, ID data is applied to the barcodes of respective barcoded tickets, and the ID data of the barcoded tickets output from a game machine is sent to a host computer and recorded therein to manage it. However, the ID data stored in the host computer must be erased after it is checked against the respective ID data of the barcoded tickets collected from the insides of the game machines. A job called "erasing" for erasing the data makes a job more time-consuming and troublesome.

In contrast, although apparatuses for identifying bank notes through the identifying portions thereof and subjecting the bank notes to various processing are known without necessity to exemplify them, an apparatus for processing barcoded tickets is disclosed in, for example, U.S. Pat. No. 6,110,044.

The processing apparatus disclosed in the U.S. Pat. No. 6,110,044 includes a barcode reader, an electronic processing unit and a display. Then, barcode data printed on a barcoded ticket inserted from a game machine is read by the bar code reader, the information read thereby is converted into a numeral value and the like corresponding to an amount of money by the electronic processing unit, and the information of the numeral value and the like that have been subjected to the conversion processing is displayed on the display.

Further, the barcode data printed on the barcoded ticket has an effective number portion, and the processing apparatus reads the number of the effective number portion written on the barcoded ticket and determines whether the information recorded in the barcode data is true or false by a total amount of money and other parameters.

However, the above processing apparatus has only a function for determining whether the barcode information is true or false and has neither a function for summarizing the information recorded in the barcoded ticket nor a function for summarizing information as to bank notes. Accordingly, even if the processing apparatus is used, the bank notes and the barcoded tickets accumulated in the game machines of the cashless game must be manually sorted or must be counted using a bank note processing apparatus and a barcoded ticket processing apparatus provided separately, or the data stored in a host computer must be erased separately similarly to the case described above, and thus the above problems cannot be solved by the processing apparatus.

SUMMARY OF THE INVENTION

In view of the above problems, an object of the present invention is to provide an apparatus and method capable of sorting and counting both bank notes and barcoded tickets by the single apparatus as well as to provide a system for erasing the data of the sorted barcoded tickets.

The object of the present invention can be achieved by a bank note and barcoded ticket sorting and stacking apparatus for sorting bank notes and barcoded tickets placed on an insertion receptacle into the bank notes and barcoded tickets, the apparatus comprising the insertion receptacle on which the bank notes and the barcoded tickets can be placed in a mixed state; conveying means having a conveying path for separately drawing out the bank notes or the barcoded tickets placed on the insertion receptacle one by one and conveying them along the conveying path; an identification unit disposed midway in the conveying path for identifying that whether the bank notes and the barcoded tickets passing through the positions where the identification units are disposed are any of the bank notes and the barcoded tickets; a plurality of stacker units disposed downstream of the identification unit for stacking the bank notes or the barcoded tickets; and sorting means interposed between the identification unit and the plurality of stacker units for sorting the bank notes and the barcoded tickets into any of the plurality of stacker units according to a result of identification executed by the identification unit.

The object of the present invention can be more effectively achieved by the bank note and barcoded ticket sorting and stacking apparatus in which the identification unit comprises a first identification sub-unit for identifying the bank notes and a second identification sub-unit for identifying the barcoded tickets.

The object of the present invention can be more effectively achieved by the bank note and barcoded ticket sorting and stacking apparatus in which the plurality of stacker units comprise a first stacker unit for stacking barcoded tickets, a second stacker unit for stacking face-side bank notes in a state that denominations of bank note are mixed, and a third stacker unit for stacking back-side bank notes in a state that denominations of bank note are mixed.

The object of the present invention can be more effectively achieved by the bank note and barcoded ticket sorting and stacking apparatus in which the plurality of stacker units comprise a first stacker unit for stacking barcoded tickets and second and third stacker units for stacking bank notes in a state that denominations of bank note are mixed regardless of that they are face-side bank notes or back-side bank notes.

The object of the present invention can be more effectively achieved by the bank note and barcoded ticket sorting and stacking apparatus in which the plurality of stacker units comprise first and second stacker units for stacking barcoded tickets and a third stacker unit for stacking bank notes in a state that denominations of bank note are mixed regardless of that they are face-side bank notes or back-side bank notes.

The object of the present invention can be more effectively achieved by the bank note and barcoded ticket sorting and stacking apparatus in which the plurality of stacker units comprise a first stacker unit for stacking barcoded tickets, a second stacker unit for stacking face-side bank notes having an erecting direction in a state that denominations of bank note are mixed, and a third stacker unit for stacking face-side bank notes having an inverting direction in a state that denominations of bank note are mixed.

The object of the present invention can be more effectively achieved by the bank note and barcoded ticket sorting and stacking apparatus in which the plurality of stacker units comprise three stacker units, and the apparatus has dimensions of 21.7 inches or less in width, 15.6 inches or less in depth, and 17.1 inches or less in height.

The object of the present invention can be more effectively achieved by the bank note and barcoded ticket sorting and stacking apparatus in which the plurality of stacker units comprise seven stacker units, and the apparatus has dimensions of 55.7 inches or less in width, 15.6 inches or less in depth, and 19.1 inches or less in height.

The object of the present invention can be more effectively achieved by the bank note and barcoded ticket sorting and stacking apparatus in which one of the plurality of stacker units stacks barcoded tickets and the remaining six stacker units stack bank notes in correspondence to the respective denominations of bank note thereof.

The object of the present invention can be achieved by a bank note and barcoded ticket sorting and stacking method, the method comprising the steps of placing bank notes and barcoded tickets on an insertion receptacle in a mixed state; conveying the bank notes or the barcoded tickets placed on the insertion receptacle along the conveying path by drawing out them one by one with conveying means; identifying whether the bank notes and the barcoded tickets are any of the bank notes and the barcoded tickets when they pass through an identification unit disposed midway in the conveying path; sorting the bank notes and the barcoded tickets into any of the plurality of stacker units by sorting means according to a result of identification executed by the identification unit; and stacking the sorted bank notes or barcoded tickets in a plurality of stacker units.

Further, the object of the present invention can be more effectively achieved by a barcoded ticket data erasing system comprising: an apparatus capable of processing both bank notes and barcoded tickets; a terminal for receiving information as to the bank notes and information as to the barcoded tickets both processed by the apparatus; and a host computer for managing the information issued by the barcoded tickets, the apparatus comprising an insertion receptacle on which the bank notes and the barcoded tickets can be placed in a mixed state; conveying means having a conveying path for separately drawing out the bank notes or the barcoded tickets placed on the insertion receptacle one by one and conveying them along the conveying path; an identification unit disposed midway in the conveying path for identifying that whether the bank notes and the barcoded tickets passing through the positions where the identification units are disposed are any of the bank notes and the barcoded tickets; a plurality of stack units disposed downstream of the identification unit for stacking the bank notes or the barcoded tickets; and sorting means interposed between the identification unit and the plurality of stacker units for sorting the bank notes and the barcoded tickets into any of the plurality of stacker units according to a result of identification executed by the identification unit, wherein the host computer executes erasing processing to collected barcoded tickets based on the data obtained by reading the IDs previously applied to the barcoded tickets and transmitted from the terminal.

DETAILED DESCRIPTION OF THE PREFERRED EMBODIMENTS

Optimum embodiments of the present invention will be explained below with reference to the drawings.

Figure 1:
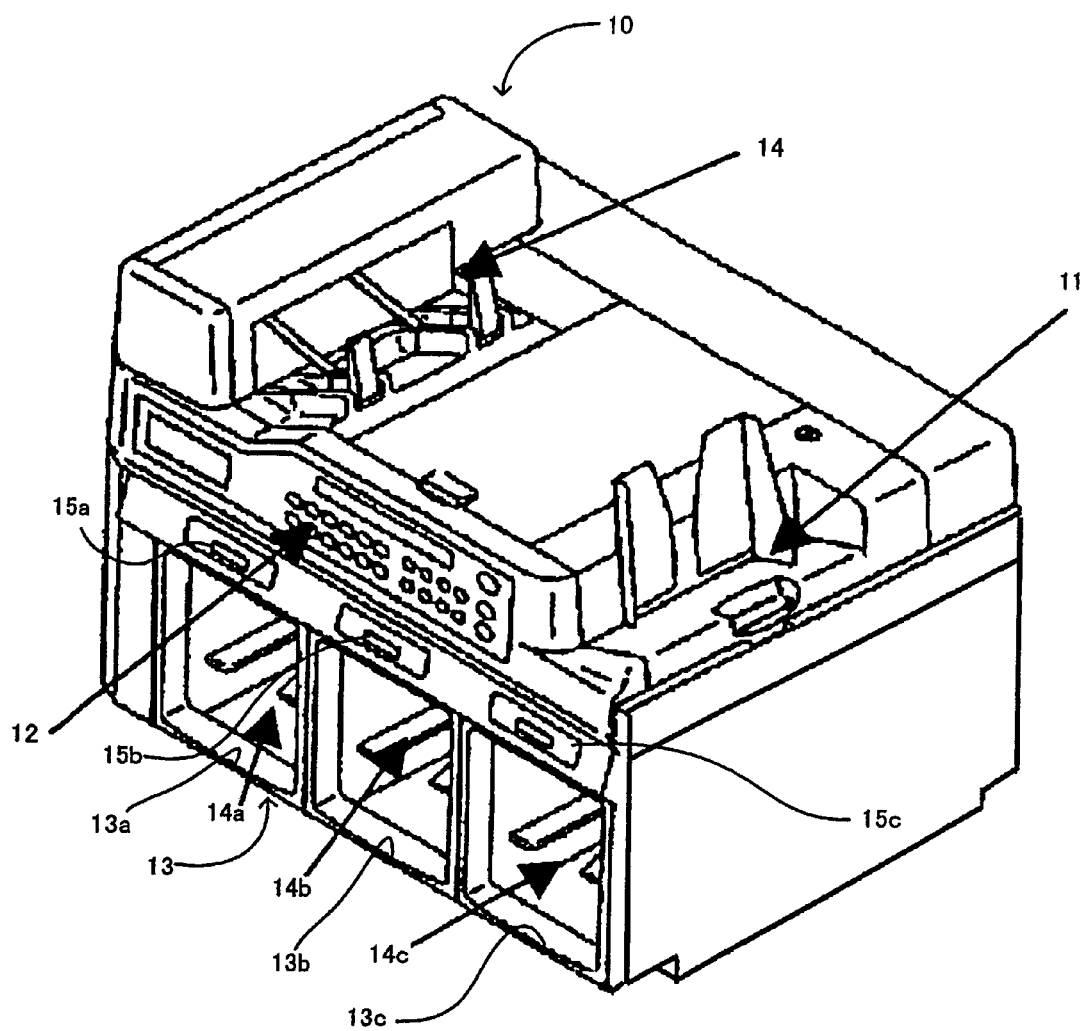
FIG. 1 is a perspective view of a bank note and barcoded ticket sorting and stacking apparatus showing an embodiment of the present invention.

FIG. 1 shows an example of an appearance arrangement of a bank note and barcoded ticket sorting and stacking apparatus 10 according to the present invention. The sorting and stacking apparatus 10 is arranged in a substantially cabinet shape having compact dimensions of 21.7 inches or less in width, 15.6 inches or less in depth, and 17.1 inches or less in height. The sorting and stacking apparatus 10 has an insertion receptacle 11 disposed at an upper portion and a display/operation unit 12 disposed on a front panel. The insertion receptacle 11 has bank notes and barcoded tickets placed thereon in a mixed state, and the display/operation unit 12 is used to indicate and input contents and the like that have been subjected to counting processing therethrough. Further, the sorting and stacking apparatus 10 has a stacker 13 disposed at a lower portion of a main body. The stacker 13 is partitioned into three stacker units and has a first stacker unit 13a for stacking barcoded tickets, a second stacker unit 13b for stacking face-side bank notes in a state that denominations of bank note are mixed, and a third stacker unit 13c for stacking back-side bank notes in a state that denominations of bank note are mixed. Further, the sorting and stacking apparatus 10 has a rejected member stacker unit 14 at an end of the upper portion of the main body so that rejected bank notes are discharged thereinto and stacked therein. Stacker unit LEDs 15a, 15b, and 15c are disposed at the upper portion on a side of the sorting and stacking apparatus 10 in correspondence to the respective stacker units 13a, 13b, and 13c to display the number of the barcoded tickets and the bank notes accommodated therein, respectively. The stacker unit LEDs 15a, 15b, and 15c are arranged to be continuously or intermittently lit. Further, the stacker units 13a, 13b, and 13c located below the stacker unit LEDs 15a, 15b, and 15c have side openings 14a, 14b, and 14c formed thereto so that the bank notes and the barcoded tickets accommodated therein can be taken out by hand.

Figure 2:
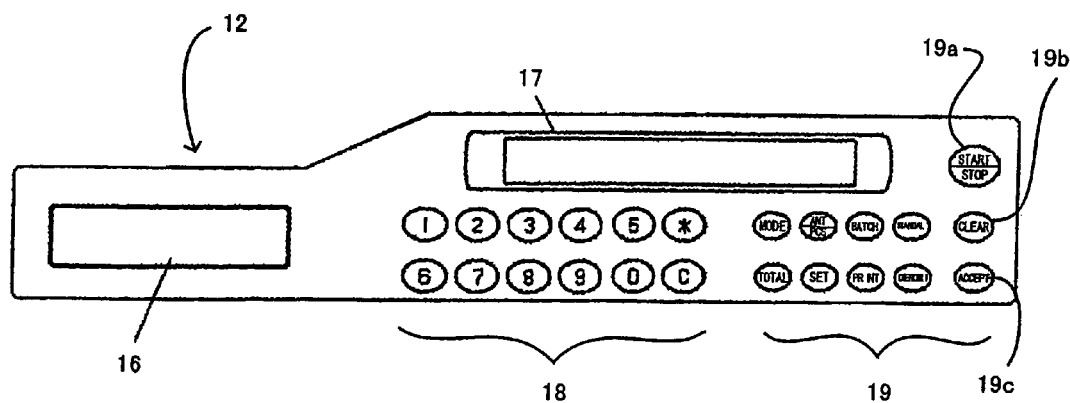
FIG. 2 is a front elevational view of a display/operation unit in the sorting and stacking apparatus.

FIG. 2 shows the display/operation unit 12 in detail. The display/operation unit 12 is composed of an LED display unit 16 for displaying a time, an error code, and the like, an LED display unit 17 composed of LEDs for displaying the sorted data and the counted data of bank notes and barcoded tickets, ten keys 18 for inputting numerical data, and operation keys 19 for instructing an operation. The operation keys 19 includes a "START/STOP" key 19a for indicating start and stop of an operation, a "CLEAR" key 19b for indicating to clear data, an "ACCEPT" key 19c for indicating to accept an input, and the like.

Figure 3:
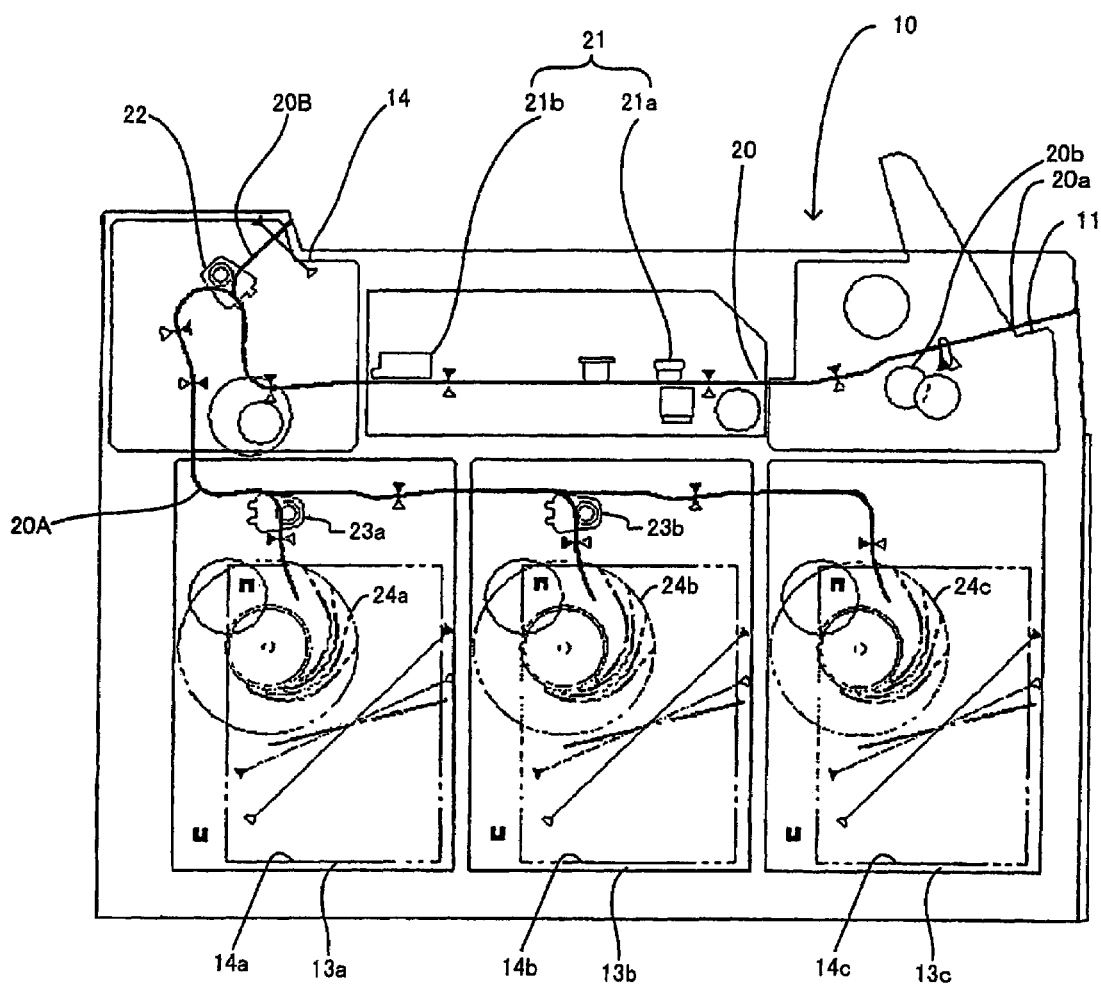
FIG. 3 is a front elevational view in longitudinal cross section of the sorting and stacking apparatus.

FIG. 3 shows a sectional structure of the sorting and stacking apparatus 10 from a side thereof. An substantially rectangular opening 20a is formed at the lower end of the insertion receptacle 11 of the sorting and stacking apparatus 10, roller-like conveying means 20b is rotatably disposed in the vicinity of the opening 20a, and a conveying path 20 is disposed from the opening 20a toward the inside of the sorting and stacking apparatus 10. An identification unit 21 is interposed between the insertion receptacle 11 and the rejected member stacker unit 14, and the conveying path 20 extends in the direction of the rejected member stacker unit 14 passing through the inside of the identification unit 21. Two sensors each composed of a different type are disposed in the identification unit 21 along the conveying path 20. One of the sensors forms a first identification sub-unit 21a for optically scanning bank notes being conveyed, and the other forms a second identification sub-unit 21b for optically scanning barcoded tickets being conveyed.

Note that, in this embodiment, a sensor of a model No. "C7161-01" made by Hamamatsu Photonics K.K. is used as the identification sensor for forming the first identification sub-unit 21a, and a sensor of a model No. "PI321MC-A6" made by Peripheral Imaging Corporation is used as the identification sensor for forming the second identification sub-unit 21b. A sorting plate 22 serving as a sorting means is disposed in the conveying path 20 of the rejected member stacker unit 14, and the conveying path 20 is branched from the sorting plate 22 to a conveying path 20A extending toward the stacker 13 located below and to a conveying path 20B extending toward the rejected member stacker unit 14. The conveying path 20A, which is located above the first and second stacker units 13a and 13b, is provided with sorting plates 23a and 23b serving as sorting means for discharging bank notes or barcoded tickets downward and sorting them into the respective stacker units 13a, 13b, and 13c. The first, second, and third stacker units 13a, 13b, and 13c have bladed wheels 24a, 24b, and 24c, respectively for aligning and stacking the bank notes or the barcoded tickets discharged from the conveying path 20A.

Figure 4:
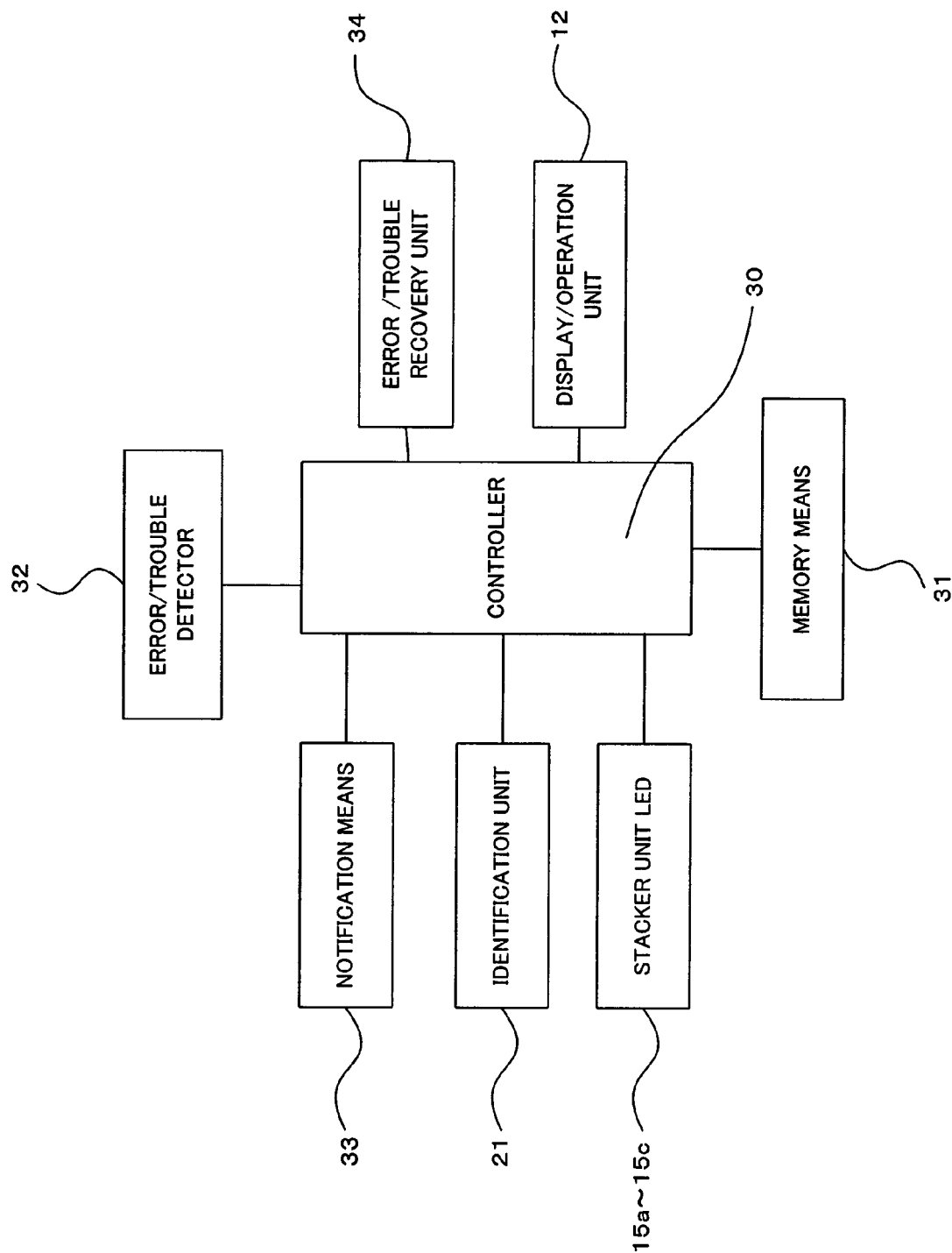
FIG. 4 is a block diagram showing an example of the internal arrangement of the sorting and stacking apparatus.

FIG. 4 shows an example of the internal arrangement of the sorting and stacking apparatus 10. In the drawing, memory means 31 is connected to a controller 30, which is composed of a CPU and the like and controls the apparatus 10 in its entirety, and the display/operation unit 12 and the identification unit 21 are also connected to the controller 30. Further, the stacker unit LEDs 15a, 15b, and 15c are connected to the controller 30, and error/trouble detector means 32 for detecting an error and a trouble such as a reading error, jamming and the like, notification means 33 for notifying that the error and the trouble are detected, and an error/trouble recovery unit 34 for recovering the error and the trouble are also connected to the controller 30.

The controller 30 controls the identification unit 21, executes processing for sorting and counting bank notes and barcoded tickets, controls the various sensors, and executes signal processing, and further controls the sorting plate 22, the sorting plates 23a and 23b, and the bladed wheels 24a, 24b, and 24c. The memory means 31 stores data such as the denominations of bank note, the number, of the bank notes of a fixed transaction and the like.

The sorting and stacking apparatus 10 according to the present invention is disposed on a processing floor on which bank notes and barcoded tickets are counted and so on. The processing floor, on which the sorting and stacking apparatus 10 is installed, and a system for erasing the data of barcoded tickets using the sorting and stacking apparatus 10 will be explained with reference to the schematic view of FIG. 5. Although it is preferable that the processing floor 40, on which the sorting and stacking apparatus 10 is installed, be a place, where players visiting a casino to play games cannot easily enter, that is, a place isolated from a play room 42 where slot machines 41a, 41b, 41c, . . . , and the like are installed, it may be disposed in a place adjacent to the play room 42 or in a part of the play room 42. In contrast, the slot machines 41a, 41b, 41c, . . . are connected to a host computer 43 so as to be in communication therewith. Further, the sorting and stacking apparatus 10 installed on the processing floor 40 is connected to a terminal 44 so as to be in communication therewith, and the terminal 44 is connected to the host computer 43 so as to be in communication therewith. Note that, as described above, the slot machines 41a, 41b, 41c, . . . are used in the cashless game, and a game can be started by insertion of a bank note 45 or a barcoded ticket 46 into an insert portion (not shown).

Next, the operations of the bank note and barcoded ticket sorting and stacking apparatus 10 and the barcoded tickets data erasing system according to the present invention will be explained with reference to the flowcharts of FIGS. 6 and 7.

First, bank notes 45 and barcoded tickets 46 are placed on the insertion receptacle 11 of the sorting and stacking apparatus 10 in a mixed state (step S1). When the "START/ STOP" key 19a of the display/operation unit 12 is depressed in this state (step S2), the conveying means 20b draws out the bank notes 45 and the barcoded tickets 46 placed on the insertion receptacle 11 one by one and starts to convey them along the conveying path 20 (step S3). Then, the bank note 45 and the barcoded ticket 46 pass through the identification unit 21 along the conveying path 20, and the first and second identification sub-units 21a and 21b in the identification unit 21 identify whether the bank notes 45 and the barcoded tickets 46 are the bank notes 45 or the barcoded tickets 46.

That is, first, the first identification sub-unit 21a identifies whether or not the bank notes 45 are face-side bank notes (step S4), and when the bank notes 45 are the face-side bank notes as a result of identification, the first identification sub-unit 21a further identifies the denomination of the bank notes 45 (step S5) as well as sorting means sorts the bank notes 45 and stacks them in the second stacker unit 13b (step S6). Next, the first identification sub-unit 21a identifies whether or not the bank notes 45 are back-side bank notes (step S7), and when the bank notes 45 are the back-side bank notes as a result of identification, the first identification sub-unit 21a further identifies the denomination of the bank notes 45 (step S8) as well as the sorting means sorts the bank notes 45 and stacks them in the third stacker unit 13c (step S9).

Note that when the bank notes 45 are not the face-side bank notes as the result of identification at step S4, the process goes to step S7, and when the bank notes 45 are not the back-side bank notes as the result of identification at step S7, the process goes to step S10 to be described later.

Next, the second identification sub-unit 21b identifies whether or not the bank notes 45 and the barcoded tickets 46 are the barcoded tickets 46 (step S10), and when they are the barcoded tickets 46 as a result of identification, the second identification sub-unit 21b further identifies the bar-coded IDs of the barcoded tickets (step S11) as well as the sorting means sorts the barcoded tickets and stacks them in the first stacker unit 13a (step S12). Note that, when the bank notes 45 and the barcoded tickets 46 are neither the face-side bank notes 45 nor the back-side bank notes 45 as the result of identification of the first identification sub-unit 21a and are not the barcoded tickets 46 as the result of identification of the second identification sub-unit 21b, they are discharged into the rejected member stacker unit 14 by the sorting plate 22 (step S13).

Subsequently to step S12, the data identified by the first and second identification sub-units 21a and 21b is transmitted to the terminal 44 (step S14), and the terminal 44 transmits the identified data received to the host computer 43 which stores the data in a memory (step S15). When the bank notes 45 and the barcoded tickets 46 are normally sorted and counted (step S16), it is displayed on the stacker unit LEDs 15a, 15b, and 15c that the job is normally completed (step S17), and an operator depresses the "START/STOP" key 19a of the display/operation unit 12 by taking a look at the notification on the displays (step S18). The data of the bank notes and the barcoded tickets, which have been sorted and counted, is fixed by depressing the "ACCEPT" key 19c and stored in the memory means 31 (step S19). At this time, the ID information of the barcoded tickets 46 identified by the second identification sub-unit 21b is sent to the host computer 43 through the terminal 44 and erased by the host computer 43 (step S20). Next, it is confirmed that all the bank notes 45 and the barcoded tickets 46 have been subjected to the above processing (step S21), and when there remain bank notes 45 and barcoded tickets 46, which are not yet subjected to the processing, the process returns to step S2 and repeats the above processing. When it is confirmed at step S21 that all the bank notes 45 and the barcoded tickets 46 have been subjected to the above processing, the processing is finished.

Note that the erasing processing executed at step S20 is different from tentative erasing processing described later, and, as described later, the ID of barcoded tickets that is tentatively erased is also transmitted to the host computer 43 at step S15. When it is determined at step S16 that the bank notes and the barcoded tickets are not normally sorted and counted, that is, when the error/trouble detector means 32 detects an error and a trouble, this is notified by the notification means 33, the operator takes out the bank notes from the respective stacker units 13a, 13b, and 13c and depresses the "CLEAR" key 19b of the display/operation unit 12 (step S30), the error/trouble recovery unit 34 recovers the error or the trouble (step S31), and then the process returns to step S2 and continues the sorting and counting processing.

Next, the operation of the present invention will be described.

Figure 5:
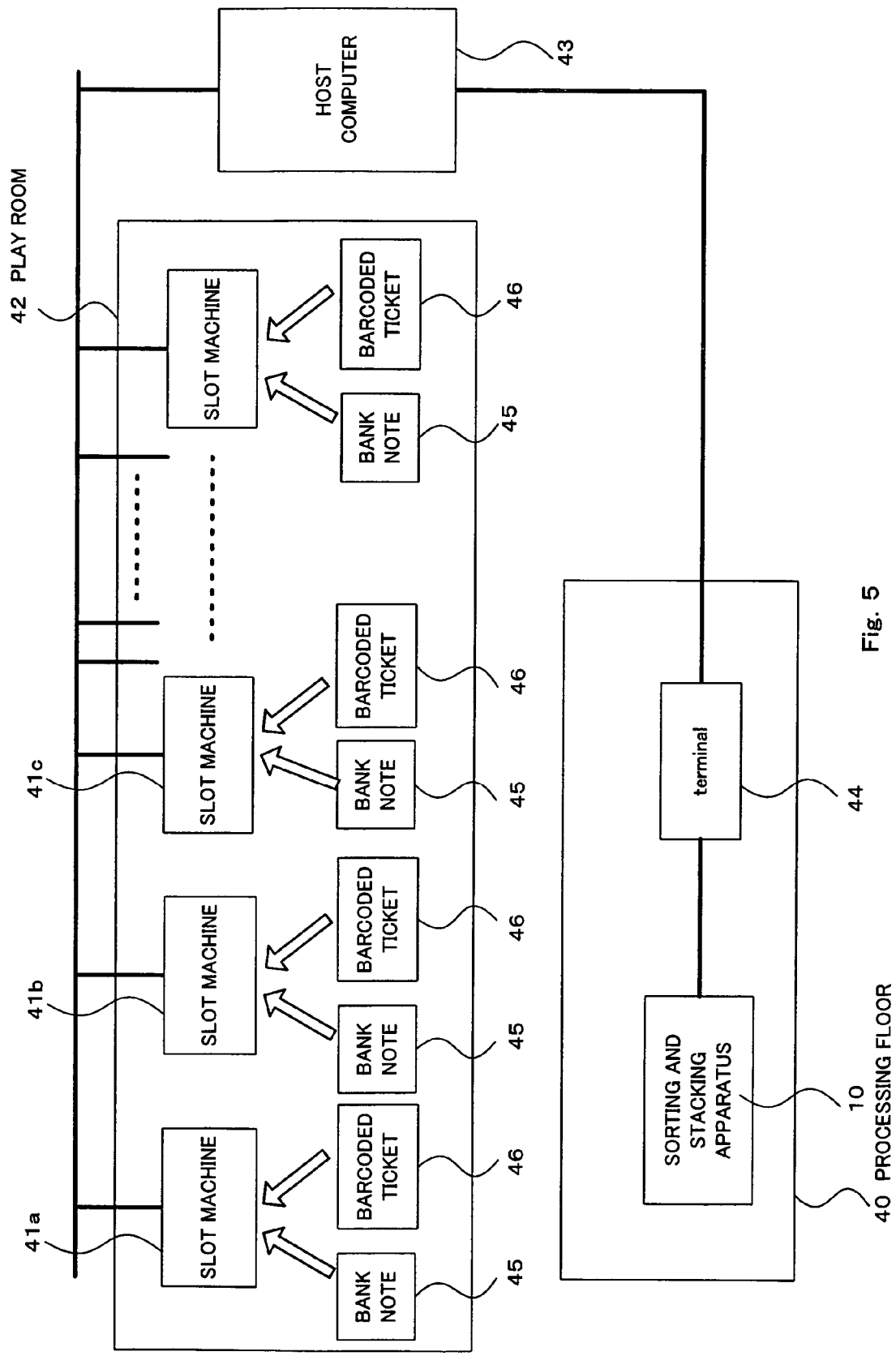
FIG. 5 is a schematic block diagram showing a processing floor on which the sorting and stacking apparatus is installed and a system for executing barcoded ticket erasing processing using the sorting and stacking apparatus.

A case that a game player plays games with the slot machines 41a and 41b in the play room 42 will be explained with reference to FIG. 5 showing an ordinary example of a play executed using slot machines. When the game player plays a game by inserting a bank note 45 into the slot machine 41a, gets a credit of, for example, $75, and finishes the game with the slot machine 41a, a barcoded ticket 46 corresponding to $75 is issued by a printer contained in the slot machine 41a in a state that ID inherent to the barcoded ticket is barcoded thereof. When the barcoded ticket 46 is issued, ticket issue information including the ID is transmitted from the slot machine 41a to the host computer 43 and stored in the memory (not shown) of the host computer 43.

Next, when the game player starts a game by inserting the barcoded ticket 46 as it is into the slot machine 41b, a bar code reader (not shown) contained in the slot machine 41b reads the ID of the barcoded ticket 46 and transmits the ID data to the host computer 43. When the host computer 43 receives the ID data transmitted from the slot machine 41b, it searches a memory area based on the ID of the barcoded ticket 46 to thereby recognize that the barcoded ticket 46 issued by the slot machine 41a moved to the slot machine 41b and tentatively erases the ID. With this operation, the game player can play the game similarly to a case that he or she inserts a $75 bank note into the slot machine 41b. Then, the barcoded ticket 46 inserted into the slot machine 41b by the game player is accumulated in the slot machine 41b in a state that many bank notes 45 and barcoded tickets 46 are mixed with each other. Many bank notes 45 and barcoded tickets 46 are mixed with each other and accumulated in other slot machines such as the slot machines 41a, 41c. . . similarly to the slot machine 41b.

Next, when the game player finishes the game and further the services presented by the slot machines 41a, 41b, . . . are finished, the bank notes 45 and the barcoded tickets 46, which are accumulated in the slot machines 41a, 41b, . . . , are collected by staffs and the like of the play room 42 and carried to the sorting and stacking apparatus 10 on the processing floor 40.

Figure 6:
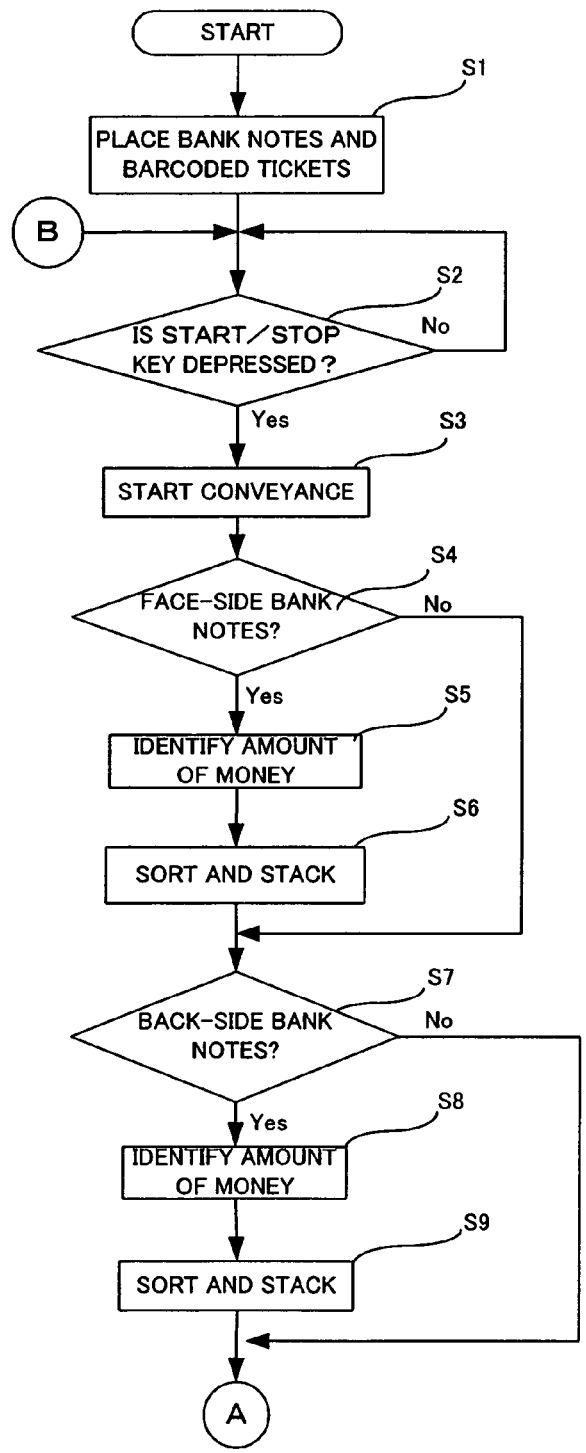
FIG. 6 is a part of a flowchart showing an example of processing executed by the sorting and stacking apparatus.
Figure 7:
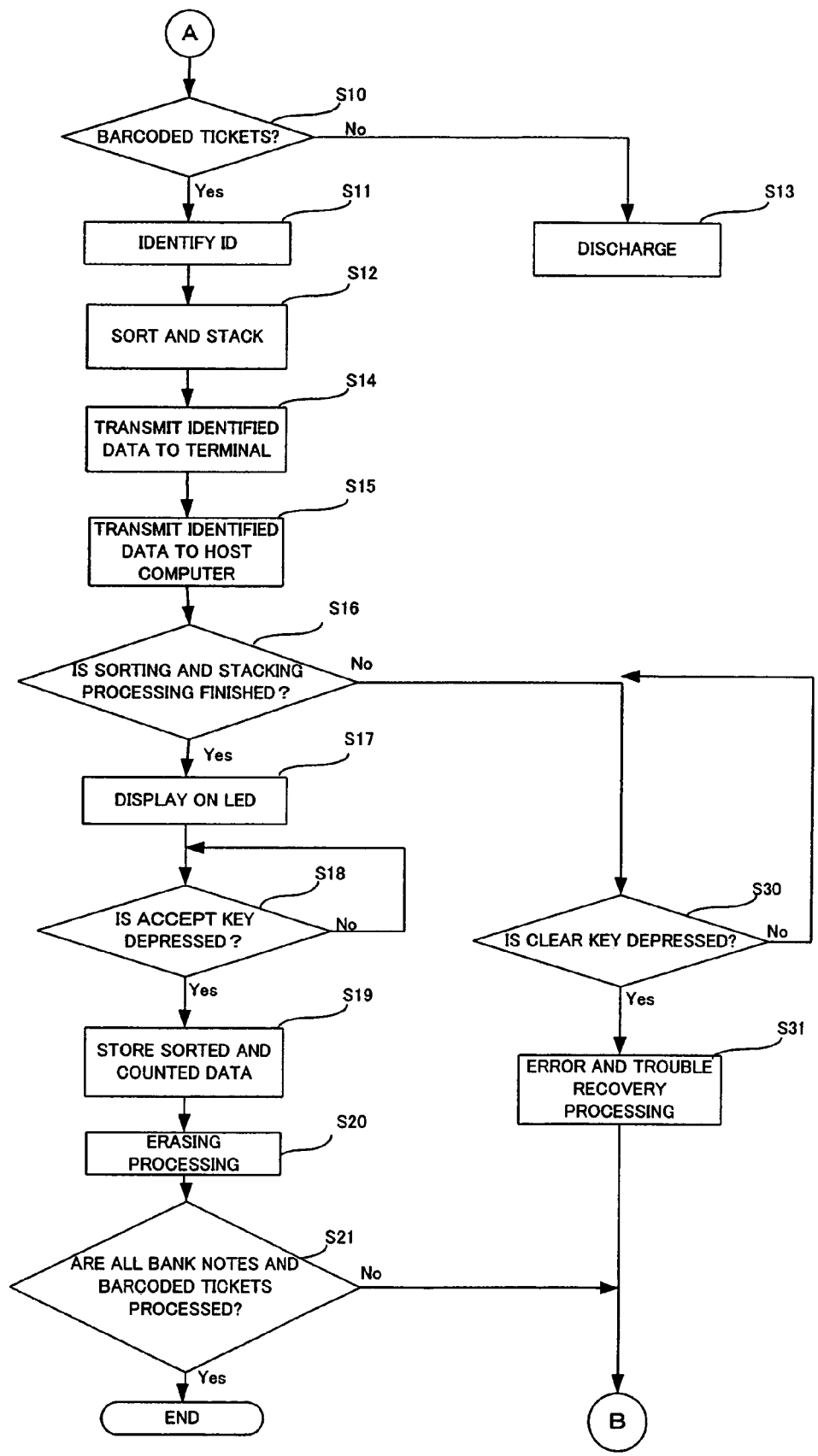
FIG. 7 is a part of a flowchart showing an example of processing executed by the sorting and stacking apparatus.

The bank notes 45 and the barcoded tickets 46 collected from the slot machines 41a, 42b, . . . are placed on the insertion receptacle 11 of the sorting and stacking apparatus 10 in a state that many bank notes 45 and barcoded tickets 46 are mixed with each other, and the face-side bank notes, the back-side bank notes, and the barcoded tickets are sorted and counted as shown in FIGS. 6 and 7.

Since the sorting and stacking apparatus 10 of the present invention, which is used to sort and count the bank notes 45 and the barcoded tickets 46, is formed in the compact dimensions of 21.7 inches or less in width, 15.6 inches or less in depth, and 17.1 inches or less in height, it can be installed on the processing floor 40 even if its dimensions are not particularly large.

When the bank notes 45 and the barcoded tickets 46 are each placed on the insertion receptacle 11 of the sorting and stacking apparatus 10 in a mixed state and the "START/STOP" key 19a is depressed, the conveying means 20b draws out the bank notes 45 and the barcoded tickets 46 one by one and conveys them to the conveying path 20 so that the bank notes 45 and the barcoded tickets 46 in the mixed state can be sorted and counted one by one. The first identification sub-unit 21a and the second identification sub-unit 21b are disposed midway in the conveying path 20, the first identification sub-unit 21a identifies whether any ones of the bank notes 45 and the barcoded tickets 46 are the bank notes 45 and whether the bank notes 45 are face-side bank notes or back-side bank notes as well as the second identification sub-unit 21b identifies whether the bank notes 45 and the barcoded tickets 46 are the barcoded tickets 46. That is, the bank notes 45 and the barcoded tickets 46 can be reliably identified by preventing erroneous identification in such a manner that the respective identification units 21a and 21b are specialized in the identification of the bank notes 45 and in the identification of the barcoded tickets 46, respectively. The face-side bank notes identified by the first identification sub-unit 21a are stacked in the second stacker unit 13b, the back-side bank notes 45 identified thereby are stacked in the third stacker unit 13c, and the barcoded tickets 46 identified by the second identification sub-unit 21b are stacked in the first stacker unit 13a, thereby the face-side bank notes 45, the back-side bank notes 45, and the barcoded tickets 46 can be automatically identified and separately processed. The barcoded tickets 46 stacked in the first stacker unit 13a, the face-side bank notes 45 stacked in the second stacker unit 13b, and the back-side bank notes 45 stacked in the third stacker unit 13c are counted and displayed on the stacker unit LEDs 15a, 15b, and 15c respectively disposed on the sides of the first, second and third stacker unit 13a, 13b, and 13c. Further, the ID information of the barcoded tickets 46 is sent to the host computer 43 and automatically erased thereby.

Note that, in the above example, the barcoded ticket 46 used by the game player in the slot machine 41b is also included in the barcoded tickets 46 which are processed by the sorting and stacking apparatus 10. However, the host computer 43 erases the barcoded ticket 46, which was tentatively erased at step S20, based on the fact that the ID of the barcoded ticket 46 was transmitted from the terminal 44 to the host computer 43 at step S15, thereby finishing the processing.

Note that, in this embodiment, although the stacker 13 is partitioned into the first stacker unit 13a for stacking the barcoded tickets 46, the second stacker unit 13b for stacking the face-side bank notes in a state that denominations of bank note are mixed, and the third stacker unit 13c for stacking the back-side bank notes in a state that denominations of bank note are mixed, the stacker 13 is by no means limited thereto. For example, the stacker 13 may be composed of a first stacker unit 13a for stacking the barcoded tickets 46 and second and third stacker units 13b and 13c for stacking the bank notes 45 in a state that denominations of bank note are mixed regardless of that the bank notes 45 are face-side bank notes 45 or back-side bank notes 45. In this case, the first identification sub-unit 21a identifies whether any ones of the bank notes 45 and the barcoded tickets 46 are the bank notes 45, the second identification sub-unit 21b identifies whether any ones of the bank notes 45 and the barcoded tickets 46 are the barcoded tickets 46, the bank notes 45 are stacked in the second and third stacker units 13b and 13c in a mixed state regardless of that they are face-side bank notes 45 or back-side bank notes 45, and the barcoded tickets 46 are stacked in the first stacker unit 13a.

Further, the first and second stacker units 13a and 13b may stack the barcoded tickets 46, and the third stacker unit 13c may stack the bank notes 45 in a state that denominations of bank note are mixed regardless of that they are face-side bank notes 45 or back-side bank notes 45.

Further, the first stacker unit 13a may stack the barcoded tickets 46, the second stacker unit 13b may stack the face-side bank notes 45 disposed in an erecting direction in a state that denominations of bank note are mixed, and the third stacker unit 13c may stack the face-side bank notes 45 disposed in an inverting direction in a state that denominations of bank note are mixed. In this case, the first identification sub-unit 21a identifies the orientation of the bank notes 45 being conveyed, and the second identification sub-unit 21b identifies whether any ones of the bank notes 45 and the barcoded tickets 46 are the barcoded tickets 46. Note that, in the above description, the term "erecting direction" means that the human figure on a bank note is directed upward, and the term "inverting direction" means that the human figure thereon is directed downward.

Figure 8:
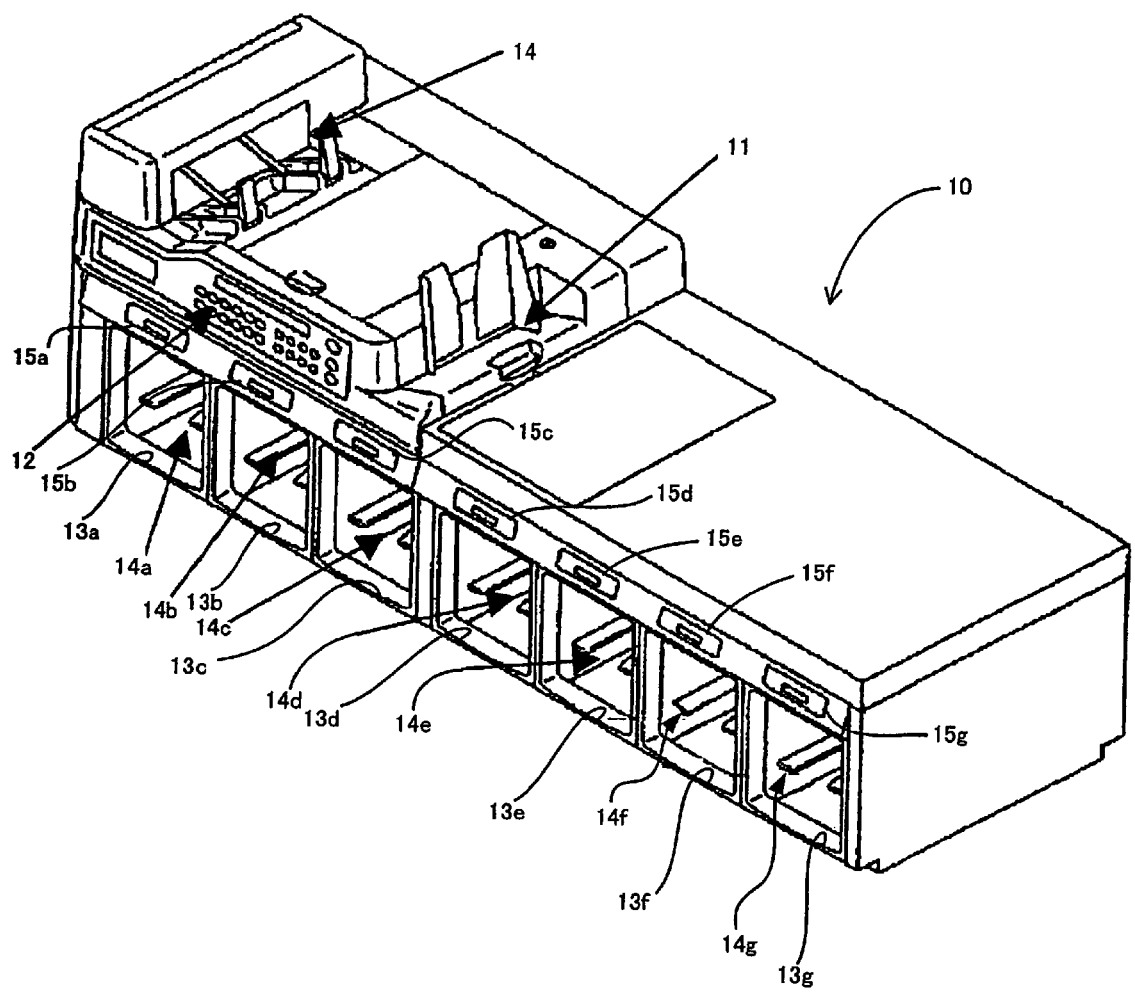
FIG. 8 is a perspective view of a bank note and barcoded ticket sorting and stacking apparatus showing another embodiment of the present invention.

Although the stacker 13 of the sorting and stacking apparatus 10 is partitioned into the three stacker sub-units, that is, into the stacker units 13a to 13c in this embodiment as shown in FIG. 1, the stacker 13 is by no means limited thereto, and it may be partitioned into, for example, seven stacker sub-units, that is, into first to seventh stacker units 13a to 13g as shown in FIG. 8. In this case, the sorting and stacking apparatus 10 is formed in an substantially cabinet shape having dimensions of 55.7 inches or less in width, 15.6 inches or less in depth, and 19.1 inches or less in height. The bank notes may be stacked in the first to sixth stacker units 13a to 13f of the stacker 13 in correspondence to the respective denominations of bank note thereof, and barcoded tickets may be stacked in the seventh stacker unit 13g. In this case, the first identification sub-unit 21a identifies the bank notes 45 in correspondence to the respective denominations of bank note thereof, and the second identification sub-unit 21b identifies the barcoded tickets 46. Since the sorting and stacking apparatus 10 is formed in the compact dimensions of 55.7 inches or less in width, 15.6 inches or less in depth, and 19.1 inches or less in height, it can be readily installed on the processing floor 40. Further, since the stacker 13 is partitioned into the seven stacker sub-units and the bank notes 45 are stacked in the first to sixth stacker units 13a to 13f in correspondence to the respective denominations of bank note thereof, a job for stacking the bank notes 45 can be more effectively executed because the bank notes 45 are stacked in a more minutely sorted state.

Note that, although the bank notes are stacked in the first to sixth stacker units 13a to 13f in correspondence to the respective denominations of bank note thereof and the barcoded tickets are stacked in the seventh stacker unit 13g in this embodiment, the embodiment is by no means limited thereto. That is, the embodiment may be arranged such that the bank notes may be sorted into face-side bank notes and back-side bank notes in a state that denominations of bank note are mixed, face-side bank notes having an erecting direction and face-side bank notes having an inverting direction and stacked in a plurality of the stacking sub-units, or the barcoded tickets 46 may be stacked in at least two of the stacker units of the stacker 13. As long as the stacker 13 is partitioned into a plurality of stacker units, a minimum function of sorting the bank notes and the barcoded tickets can be achieved. Thus, the number of the stacker units may be set to any plural number other then three and seven.

Although the various types of the two sensors are disposed in the conveying path 20 and one of the them is arranged as the first identification sub-unit 21a for identifying the bank notes 45 and the other of them is arranged as the second identification sub-unit 21b for identifying the barcoded tickets 46 in this embodiment, the embodiment is by no means limited thereto. Further, a single high resolution identification sensor 21a may be disposed in the conveying path 20 and arranged as the first identification sub-unit 21a for identifying both the barcoded tickets 46 and the bank notes 45. The cost of the sorting and stacking apparatus 10 can be reduced by providing the single sensor as the various types of the sensors.

According to the present invention, since the bank notes and the barcoded tickets stacked in a mixed state can be sorted and counted by the single sorting and stacking apparatus, a sorting job by hand is not needed.

Further, according to the present invention, since the ID inherent to a barcoded ticket is sent to the host computer through the terminal, data processing such as the erasing processing can be executed in a host computer.

What is claimed is:

1. A bank note and barcoded ticket sorting and stacking apparatus for sorting bank notes and barcoded tickets placed on an insertion receptacle into the bank notes and barcoded tickets, comprising:
   the insertion receptacle on which the bank notes and the barcoded tickets can be placed in a mixed state;
   conveying means having a conveying path for separately drawing out the bank notes or the barcoded tickets placed on the insertion receptacle one by one and conveying them along the conveying path;
   an identification unit disposed midway in the conveying path for identifying that whether the bank notes and the barcoded tickets passing through the positions where the identification unit is disposed are any of the bank notes and the barcoded tickets;
   a plurality of stacker units disposed downstream of the identification unit for stacking the bank notes or the barcoded tickets; and
   sorting means interposed between the identification unit and the plurality of stacker units for sorting the bank notes and the barcoded tickets into any of the plurality of stacker units according to a result of identification executed by the identification unit;
   wherein the identification unit comprises a first identification sub-unit for identifying the bank notes and a second identification sub-unit for identifying the barcoded tickets.

2. A bank note and barcoded ticket sorting and stacking apparatus according to claim 1, wherein the plurality of stacker units comprises a first stacker unit for stacking barcoded tickets, a second stacker unit for stacking face-side bank notes in a state that denominations of bank note are mixed, and a third stacker unit for stacking back-side bank notes in a state that denominations of bank note are mixed.

3. A bank note and barcoded ticket sorting and stacking apparatus according to claim 1, wherein the plurality of stacker units comprises a first stacker unit for stacking barcoded tickets and second and third stacker units for stacking bank notes in a state that denominations of bank note are mixed regardless of that they are face-side bank notes or back-side bank notes.

4. A bank note and barcoded ticket sorting and stacking apparatus according to claim 1, wherein the plurality of stacker units comprises first and second stacker units for stacking barcoded tickets and a third stacker unit for stacking bank notes in a state that denominations of bank note are mixed regardless of that they are face-side bank notes or back-side bank notes.

5. A bank note and barcoded ticket sorting and stacking apparatus according to claim 1, wherein the plurality of stacker units comprises a first stacker unit for stacking barcoded tickets, a second stacker unit for stacking face-side bank notes having an erecting direction in a state that denominations of bank note are mixed, and a third stacker unit for stacking face-side bank notes having an inverting direction in a state that denominations of bank note are mixed.

6. A bank note and barcoded ticket sorting and stacking apparatus according to claim 1, wherein the plurality of stacker units comprise three stacker units, and the apparatus has dimensions of 21.7 inches or less in width, 15.6 inches or less in depth, and 17.1 inches or less in height.

7. A bank note and barcoded ticket sorting and stacking apparatus according to claim 1, wherein the plurality of stacker units comprise seven stacker units, and the apparatus has dimensions of 55.7 inches or less in width, 15.6 inches or less in depth, and 19.1 inches or less in height.

8. A bank note and barcoded ticket sorting and stacking apparatus according to claim 7, wherein one of the plurality of stacker units stacks barcoded tickets and the remaining six stacker units stack bank notes in correspondence to the respective denominations of bank note thereof.

9. A bank note and barcoded ticket sorting and stacking method comprising the steps of:
   placing bank notes and barcoded tickets on an insertion receptacle in a mixed state; conveying the bank notes or the barcoded tickets placed on the insertion receptacle along the conveying path by drawing out them one by one with conveying means;
   identifying whether the bank notes and the barcoded tickets are any of the bank notes and the barcoded tickets when they pass through an identification unit disposed midway in the conveying path; and
   sorting the bank notes and the barcoded tickets into any of a plurality of stacker units by sorting means according to a result of identification executed by the identification unit;
   wherein the identification unit comprises a first identification sub-unit for identifying the bank notes and a second identification sub-unit for identifying the barcoded tickets.

10. A barcoded ticket data erasing system comprising:
   an apparatus capable of processing both bank notes and barcoded tickets;
   a terminal for receiving information as to the bank notes and information as to the barcoded tickets both processed by the apparatus; and
   a host computer for managing the information of the barcoded tickets, wherein the apparatus comprising insertion receptacle on which the bank notes and the barcoded tickets can be placed in a mixed state;

conveying means having a conveying path for separately drawing out the bank notes or the barcoded tickets placed on the insertion receptacle one by one and conveying them along the conveying path;

an identification unit disposed midway in the conveying path for identifying that whether the bank notes and the barcoded tickets passing through the positions where the identification unit is disposed are any of the bank notes and the barcoded tickets;

a plurality of stack units disposed downstream of the identification unit for stacking the bank notes or the barcoded tickets; and sorting means interposed between the identification unit and the plurality of stacker units for sorting the bank notes and the barcoded tickets into any of the plurality of stacker units according to a result of identification executed by the identification unit, wherein the host computer executes erasing processing to collected barcoded tickets based on the data obtained by reading the IDs previously applied to the barcoded tickets and transmitted from the terminal.

* * * * *

UNITED STATES PATENT AND TRADEMARK OFFICE
CERTIFICATE OF CORRECTION

| | |
|---|---|
| PATENT NO. | : 7,040,476 B2 |
| APPLICATION NO. | : 10/652885 |
| DATED | : May 9, 2006 |
| INVENTOR(S) | : Tatsuya Sugano et al. |

It is certified that error appears in the above-identified patent and that said Letters Patent is hereby corrected as shown below:

Title page, Item [75] Insert
--Montgomery Teague-- as a co-inventor to the above-identified U.S. Patent number.

Signed and Sealed this

Twentieth Day of May, 2008

JON W. DUDAS
*Director of the United States Patent and Trademark Office*